United States Patent
Park et al.

(10) Patent No.: US 9,195,389 B2
(45) Date of Patent: Nov. 24, 2015

(54) MENU EXECUTING METHOD AND APPARATUS IN PORTABLE TERMINAL

(75) Inventors: Young-Joo Park, Gyeonggi-do (KR); Sun-Gi Hong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 45 days.

(21) Appl. No.: 13/011,101

(22) Filed: Jan. 21, 2011

(65) Prior Publication Data

US 2011/0202878 A1 Aug. 18, 2011

Related U.S. Application Data (60) Provisional application No. 61/304,037, filed on Feb. 12, 2010.

(30) Foreign Application Priority Data

Feb. 12, 2010 (KR) ........................ 10-2010-0013570

(51) Int. Cl.
  *G06F 3/048*   (2013.01)
  *G06F 3/0488*  (2013.01)
  *G06F 3/0482*  (2013.01)

(52) U.S. Cl.
  CPC .......... *G06F 3/04883* (2013.01); *G06F 3/0482* (2013.01)

(58) Field of Classification Search
  CPC .......................... G06F 3/048; G06F 3/04883
  USPC ................................................. 715/825, 829
  See application file for complete search history.

(56) References Cited

U.S. PATENT DOCUMENTS

| 5,745,116 A | 4/1998 | Pisutha-Arnond |
| 8,788,954 B2 | 7/2014 | Lemay et al. |

(Continued)

FOREIGN PATENT DOCUMENTS

| CN | 101627359 A | 1/2010 |
| EP | 1621983 A2 | 2/2006 |

(Continued)

OTHER PUBLICATIONS

Apple; "iPhone User's Guide;" Dec. 31, 2007 Rtrvd from Internet: http://web.archive.org/web/20070703120814/http://manuals.info.apple.com/en/iPhone_User_Guide.pdf [rtvd Dec. 31, 2007]; XP 002570019.

(Continued)

*Primary Examiner* — Andrea Leggett
(74) *Attorney, Agent, or Firm* — Cha & Reiter, LLC (57) ABSTRACT

Provided is a menu execution method and apparatus in a portable terminal. The menu execution method includes displaying, on a touch screen, an item list which comprises a plurality of divided regions in each of which a corresponding item is formed, recognizing a user gesture at one of a first position and a second position, the second position being different from the first position, and executing a menu corresponding to the recognized position, in which a first menu for providing a first service related to the item formed in the divided region is preset in the first position of the divided region on the touch screen, and a second menu for providing a second service related to the item formed in the divided region is preset in the second position of the divided region on the touch screen, the first and second services being different.

26 Claims, 6 Drawing Sheets

(56) References Cited

U.S. PATENT DOCUMENTS

| | | | |
|---|---|---|---|
| 2003/0098891 A1 | 5/2003 | Molander | |
| 2006/0121939 A1 | 6/2006 | Anwar et al. | |
| 2008/0074399 A1* | 3/2008 | Lee | 345/173 |
| 2008/0163119 A1* | 7/2008 | Kim et al. | 715/840 |
| 2008/0165136 A1 | 7/2008 | Christie et al. | |
| 2009/0239588 A1 | 9/2009 | Nam | |
| 2009/0278806 A1* | 11/2009 | Duarte et al. | 345/173 |
| 2009/0282360 A1* | 11/2009 | Park et al. | 715/786 |
| 2009/0307631 A1* | 12/2009 | Kim et al. | 715/830 |
| 2010/0013780 A1 | 1/2010 | Ikeda et al. | |

FOREIGN PATENT DOCUMENTS

| | | | | |
|---|---|---|---|---|
| JP | 2006-164261 A | 6/2006 | | |
| JP | 2008-47027 A | 2/2008 | | |
| JP | 2010-26710 A | 2/2010 | | |
| KR | 10-0807737 B1 | 2/2008 | | H04B 1/40 |
| KR | 10-0915667 B1 | 8/2009 | | G06F 3/048 |
| WO | 2009/137419 A2 | 11/2009 | | |

OTHER PUBLICATIONS

Corel Corp; "Menus in WordPerfect Version 6.1 for Windows—Nov. 4, 1994;" Nov. 4, 1994; Rtrvd from Internet: http://en.wikipedia.org/wiki/Corel_WordPerfect_Office [rtvd Apr. 5, 2012]; XP55023990.

Yang, Li; "Beyond Pitch and Flick: Enriching Mobile Gesture Interaction;" Computer, IEEE Service Center, California, vol. 42, No. 12; Dec. 1, 2009; XP011286240.

* cited by examiner

MENU EXECUTING METHOD AND APPARATUS IN PORTABLE TERMINAL

CLAIM OF PRIORITY

This application claims priority to, and the benefit of the earlier filing date, under 35 U.S.C. §119(a), to that Korean Patent Application filed in the Korean Intellectual Property Office on Feb. 12, 2010 and assigned Serial No. 10-2010-0013570 and under 35 U.S.C. §119(e) to that U.S. Provisional application filed on Feb. 12, 2010 in the U.S. Patent and Trademark Office and assigned Ser. No. 61/304,037, the entire disclosures of both of which are hereby incorporated by references.

BACKGROUND OF THE INVENTION

1. Field of the Invention

The present invention relates to the field of portable terminals and more particularly, to a menu executing method and apparatus in a portable terminal, by which a user's gesture is sensed to automatically display a menu related to a particular service function.

2. Description of the Related Art

With the technology development of mobile devices, mobile communication terminals have been equipped with various multimedia functions as well as simple phone call functions, and can also access the Internet. In particular, in devices having Personal Digital Assistant (PDA) functions, such as smart phones, various applications can be executed. Such devices provide not only cellular phone functions, but also various application services such as MP3, camera, wireless Internet, e-mail, and message services.

With the increase in the number of application services, a variety of menus for executing corresponding applications have been created. As a number of applications are integrated in a single terminal, additional service functions corresponding to the integrated applications also increases and, thus, several stages are required to use an additional service function provided by each application.

In other words, as the additional service functions increase, a plurality of execution commands form a particular menu group, and each menu group includes a plurality of execution commands or sub-menus. To execute a desired particular menu, a user has to select a predetermined menu group and then execute a command included in the selected menu group.

The user also selects a sub-menu included in the selected menu group, selects a predetermined command among a plurality of execution commands included in the selected sub-menu, and executes the selected command.

Figure 1:
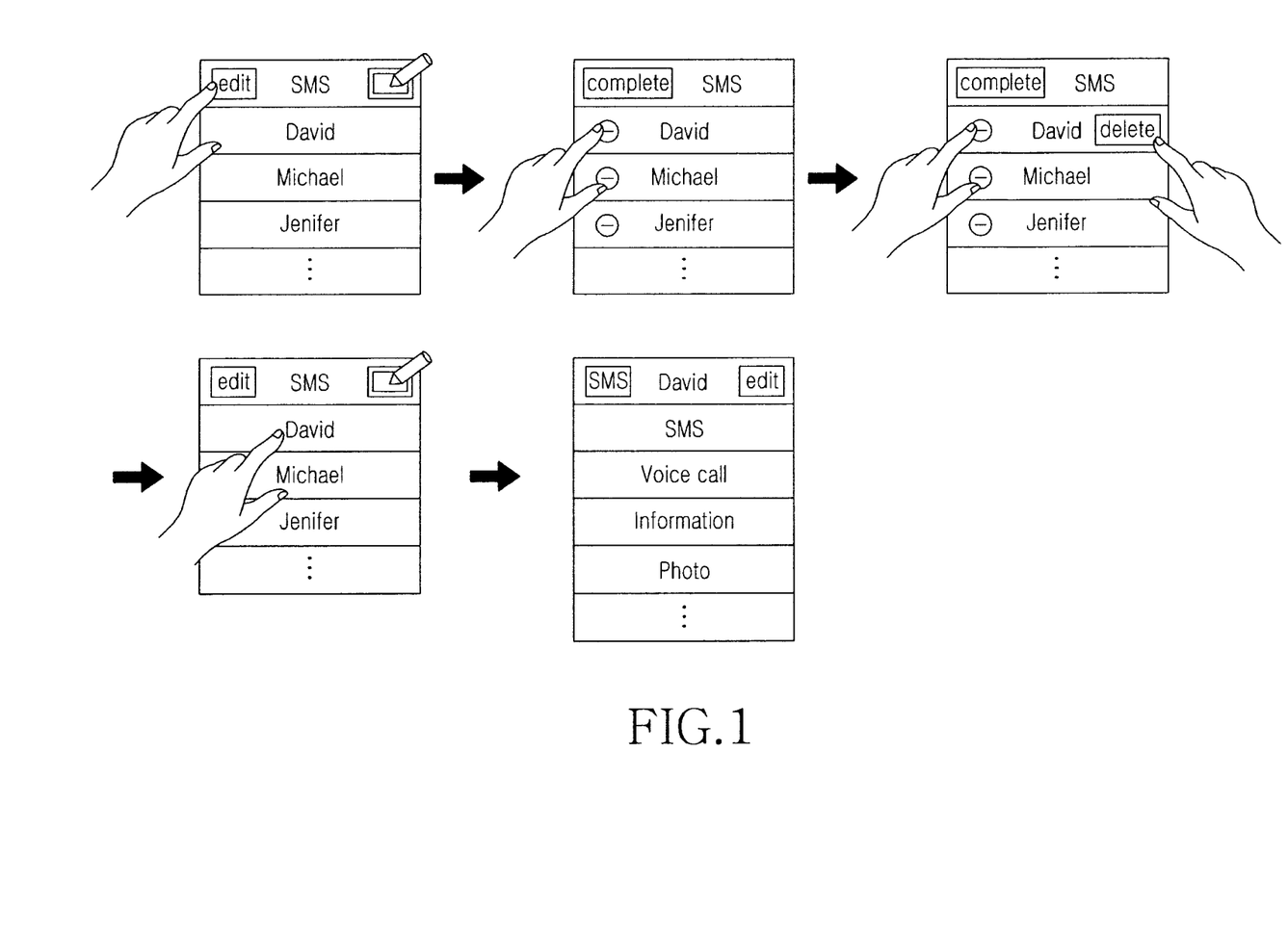
FIG. 1 is a diagram illustrating in brief an operation performed to execute a menu related to a particular service function in a general portable terminal.

FIG. 1 is a diagram illustrating in brief an operation performed to execute a menu related to a particular service function (for example, a Short Messaging Service (SMS) text message service) in a general portable terminal. As shown in FIG. 1, to delete text messages from some or all subscribers or transmit a text message to one or more subscribers displayed (e.g., a list of subscribers that exchange SMS text messages with the user, such as David, Michael, Jenifer . . . , ), the user, when using an SMS text message service function, must go to a received message box to search for a message to be transmitted. After the message is found, the user has to press, or touch, a menu button and if a menu list is displayed, the user selects a "send" button by using a "move" button and performs transmission by pressing or touching the selected "send" button. In this way, the user has to undergo several stages (or levels of manipulation) to execute a desired menu due to frequency movement between screens.

SUMMARY OF THE INVENTION

Accordingly, an aspect of the present invention is to provide a fast menu executing method and apparatus to rapidly execute a plurality of additional functions provided by application services.

According to an aspect of the present invention, there is provided a menu execution method in a portable terminal. The menu execution method includes displaying, on a touch screen, an item list which comprises a plurality of divided regions in each of which a corresponding item is formed, recognizing a user gesture at one of a first position and a second position, the second position being different from the first position in the divided region, and executing a menu being preset corresponding to the recognized position, in which a first menu for providing a first service related to the item formed in the divided region is preset in the first position of the divided region on the touch screen, and a second menu for providing a second service, which is related to the item formed in the divided region and is different from the first service, is preset in the second position of the divided region on the touch screen.

According to another aspect of the present invention, there is provided a menu execution apparatus in a portable terminal. The menu execution apparatus includes a touch screen and a controller for displaying, on the touch screen, an item list which comprises a plurality of divided regions in each of which a corresponding item is formed, for recognizing a user gesture at one of a first position and a second position, the second position being different from the first position in the divided region, and for executing a menu being preset corresponding to the recognized position, in which a first menu for providing a first service related to the item formed in the divided region is preset in the first position of the divided region on the touch screen, and a second menu for providing a second service, which is related to the item formed in the divided region and is different from the first service, is preset in the second position of the divided region on the touch screen.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Exemplary embodiments of the present invention will be described in detail with reference to the accompanying drawings. In the following description, specific items such as particular components are described only to provide overall understanding of the present invention. It will be apparent to those of ordinary skill in the art that changes or modifications can be made from the teaches provided herein without departing from the scope of the present invention and such changes and/or modifications have been contemplated and considered to be within the scope of the claims provided herein.

A portable terminal according to the present invention is implemented as a touch screen type, and in particular, provides a technique for sensing a user's gesture (or a user gesture) generated in a display unit region of the portable terminal and automatically displaying a menu related to a particular service function to immediately execute the displayed menu.

More preferably, the present invention proposes a technique for instantly providing an application of a function, so that a preset function can be executed immediately by a user touch related gesture in an item list or data list state without a need to enter a particular menu tree.

In addition, in regard to a particular menu related to a service function automatically displayed by a user's gesture in a display unit region of a portable terminal having a touch screen, the present invention activates and provides a plurality of menu lists to enable a user to directly reset a separate menu for fast execution, thus providing user-specific menu execution to each user and allowing the user to benefit from easy and fast menu execution without a need to go through several stages or levels of menu/submenu combinations.

Prior to a detailed description of the present invention, a term "user's gesture" described below means "intention" of a user to input data through an input unit, the touch screen of the portable terminal, in which the user points a certain point of the touch screen, by contacting, that is, touching the point.

For example, in the portable terminal, the user's gesture may include a single tap for selecting or activating a target object, a double tap for changing a display format or a screen image, a dragging action that drags a point on the touch screen to another position while pressing the point, a pinch action that senses two fingers moving away from each other to increase the size of an object or close to each other to reduce the size of an object, an unpinch action that is an opposite action of the pinch action, a flick action that represents a fast movement (i.e., flicks up and down) on the screen, and a long touch action press that presses an object without removing the finger from the object.

While the flick and the long touch press actions will be described as examples of the user's gesture in an embodiment of the present invention, the present invention is not limited to these examples.

According to an aspect of the present invention, a menu execution method in a portable terminal includes a step of displaying, on a touch screen, an item list having a plurality of divided regions, in each of which a corresponding item is formed, a step of recognizing a user's gesture with respect to a first position of the divided region or a second position (the second position being different from the first position), and a step of executing a menu corresponding to the recognized position, in which a first menu for providing a first service related to the item formed in the divided region is preset in the first position of the divided region on the touch screen, and a second menu for providing a second service that is associated with the item formed in the divided region and is different from the first service is preset in the second position.

According to another aspect of the present invention, a menu execution apparatus in a portable terminal includes a controller for displaying, on a touch screen, an item list having a plurality of divided regions, in each of which a corresponding item is formed, for recognizing a user's gesture with respect to a first position of the divided region or a second position of the divided region, and for executing a menu corresponding to the recognized position, in which a first menu for providing a first service related to the item formed in the divided region is preset in the first position of the divided region on the touch screen, and a second menu for providing a second service that is associated with the item formed in the divided region and is different from the first service is preset in the second position.

With reference to FIGS. 2 through 4B, a detailed description will be made of a menu execution method in a portable terminal according to an embodiment of the present invention.

Figure 2:
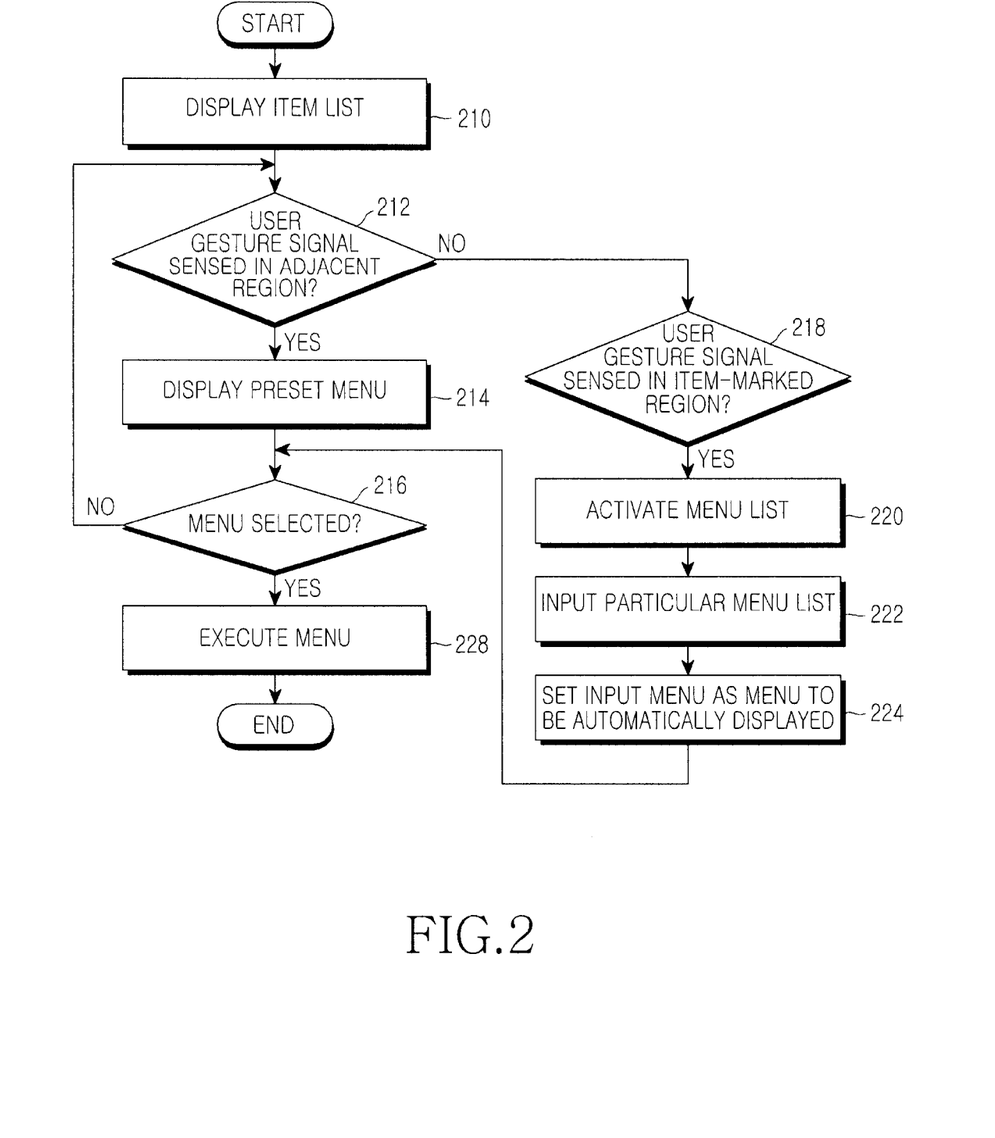
FIG. 2 is a flowchart illustrating a menu executing method in a portable terminal according to an embodiment of the present invention.

FIG. 2 is a flowchart illustrating a menu executing method in a portable terminal according to an embodiment of the present invention.

Figure 4A:
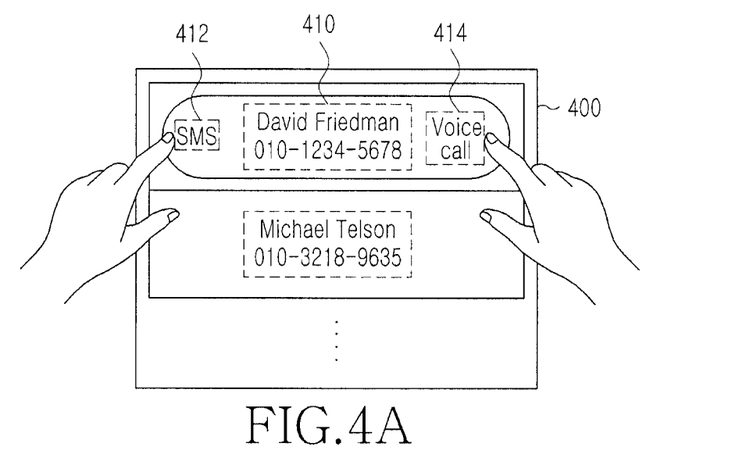
FIGS. 4A and 4B are diagrams illustrating screens to which a menu executing method in a portable terminal according to an embodiment of the present invention is applied.
Figure 4B:
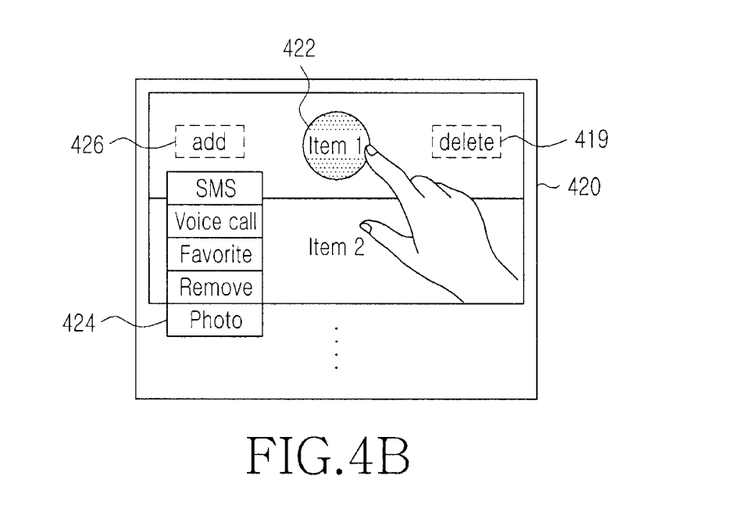

FIGS. 4A and 4B are diagrams illustrating screens to which a menu executing method in a portable terminal according to an embodiment of the present invention is applied. FIG. 4A illustrates a typical display for including menus for automatically executing desired applications associated with a partner. In this exemplary example, partner David Friedman has associated an automatic SMS and a Voice call application with the appropriate touch of a left region 412 and a right region 414, respectively. FIG. 4B illustrates case where a user may set the left and right regions with desired applications.

Referring to FIG. 2, in step 210, an item list in a particular service function supported by the portable terminal is displayed.

That is, an item list in service functions of various applications supported by the portable terminal is displayed on a display unit region of the portable terminal upon input of a request for executing the particular service function from the user. The list of service function may, for example, represent a phone book, a message, an e-mail, a small notebook computer, and a media player functions, and so forth. In addition, user-stored information generated by user's inputs (for example, names, phone numbers, pictures, addresses, etc.) corresponding to the service functions may be displayed.

Respective items in the item list displayed on the display unit region are displayed on respective regions of the display unit region, which have been divided into as many regions as the number of items of the particular service function.

Next, in step 212, it is determined whether a user gesture signal is input in a region that is adjacent to a region where each item is marked in the displayed item list.

The item means one displayed in the form of a text or an icon that can be pointed to, or selected, by a user input means. For example, the user input means may be a finger, a stylus pen, or the like.

Referring to FIG. 4A, the region where an item is marked is in a form indicated by 410, and refers to a point region inked in the form of a text for each of the divided regions in the item list displayed on a display unit region 400 of the portable terminal. What is sensed or determined in step 212 is an input or a non-input of the user gesture signal and refers to a pointing action among a long press touch, a tap action, and a flick action generated in the display unit region 400 due to a user's touch (or user touch) in a region adjacent to the item-marked region 410 except for the item-marked region 410.

The adjacent region means at least a left, and a right region, and each may include an upper area and a lower area, around the item-marked region 410. In the example, shown in FIG. 4A, only a left region 412 and a right region 414 are shown. However, it would be obvious to include an upper region and a lower region in each of left region 412 and right region 414. In this case, then up to four preset or predefined applications may be associated with an item.

If the input of the user gesture signal is sensed in step 212, a menu provided by the service function is automatically displayed in the region where the input of the user gesture signal is sensed, in step 214.

In other words, the automatically displayed menu may be, for example, "SMS" in the left region 412 or "Voice call" in the right region 414 as shown in FIG. 4A, and is one of a plurality of execution commands included in a plurality of menu lists applicable to an item (e.g., "David Friedman 010-1234-5678" in the region 410).

The menu, which may be a default menu and preset during an initial setup of the portable terminal, may be set or reset by the user. For example, a default menu may be established by the terminal manufacturer. But the user may modify the default menu based on personal preferences. The user may also reset the terminal back to the manufacturer's default menu when desired. Such setting and resetting is well-known in the art and need not be described herein.

In step 216, it is determined whether the user has selected the menu automatically displayed in step 214 (for example, "SMS" or "Voice call"), and if so, the selected menu is immediately executed.

If the input of the user gesture signal is not sensed in step 212, the process goes to step 218 to check if the input of the user gesture signal is sensed in the item-marked region 410.

If the input of the user gesture signal is sensed in the item-marked region 410, the process goes to step 220 to activate menu lists related to the service function in a predetermined region of the item-marked region 410.

Referring to FIG. 4B, an operation of activating the menu lists means displaying at least one menu list provided by the service function (e.g., SMS, Voice call, Favorite, Remove, and Photo) at a side of the item-marked region 410 in the form of a separate window 424.

In step 222, a particular menu list is selected that represents the user's desire to set the selected menu as a default menu. In step 224, the selected menu is set as that menu to be automatically displayed by a user's gesture in a region adjacent to the item-marked region 410 in the same way as in step 214. Then the process goes to step 216 to perform subsequent operations.

The menu execution method in the portable terminal according to an embodiment of the present invention has been described so far.

Hereinafter, a menu execution apparatus in a portable terminal according to an embodiment of the present invention will be described in detail with reference to FIG. 3.

Figure 3:
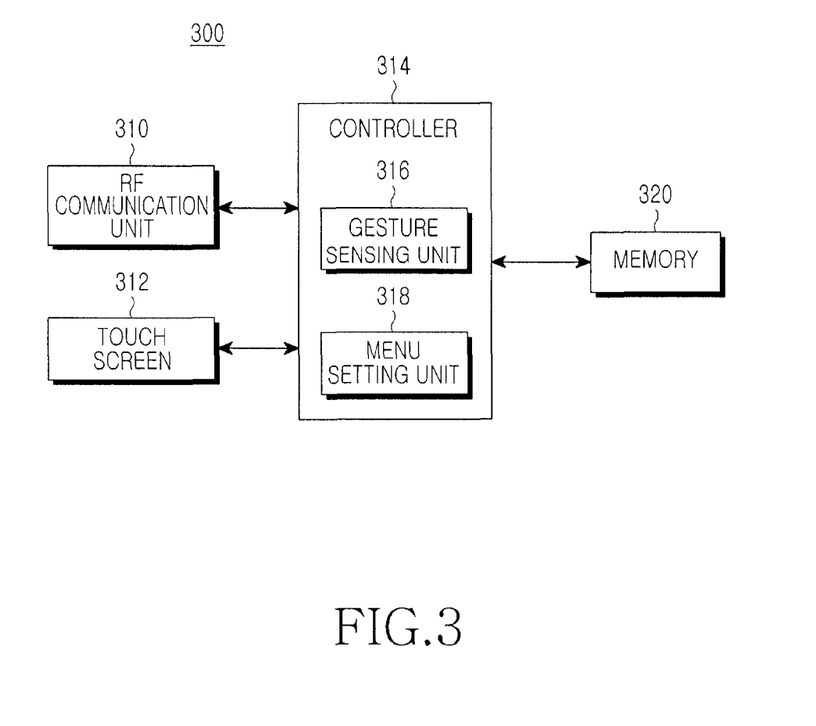
FIG. 3 is a block diagram of a menu executing apparatus in a portable terminal according to an embodiment of the present invention.

FIG. 3 is a block diagram of a menu execution apparatus 300 in a portable terminal according to an embodiment of the present invention.

Although the menu execution apparatus 300 shown includes a Radio Frequency (RF) communication unit 310, a touch screen 312, a controller 314, and a memory 320 in FIG. 3, it would be within the knowledge of those skilled in the art that the apparatus may further include a camera, a speaker, a microphone, and so forth.

The RF communication unit 310 receives a radio downlink signal from the air via an antenna (not shown), and outputs to the controller 314 downlink data signal acquired by demodulating the radio downlink signal. The RF communication unit 310 further generates a radio uplink signal by modulating uplink data input from the controller 314 and wirelessly transmits the generated radio uplink signal to the air via the not-shown antenna. The modulation and the demodulation may be preferably performed according to Code Division Multiple Access (CDMA), Frequency Division Multiplexing (FDM), or Time Division Multiplexing (TDM).

The touch screen 312 may include a display unit (not shown) for displaying the process and result of execution according to an input signal of every application supported by the portable terminal under the control of the controller 314 (e.g., a plurality of service functions and an item list in the service functions) and an input unit (not shown) for generating a touch interrupt upon a touch on the display unit by the user and outputting the touch interrupt to the controller 314.

In other words, an image is displayed under the control of the controller 314, and upon touch on the surface of the image by the user input means such as a finger or a stylus pen, the touch interrupt is generated, and user input information including input coordinates and an input state is output to the controller 314. Herein, the touch interrupt is identical to a key input interrupt generated on a conventional touch screen.

The touch screen 312 may output a sensing value (a pressure, a resistance, or a static capacity) corresponding to an operating type (a pressure type, a resistive type, or a static-capacitive type) to the controller 314, or may generate an input interrupt indicating a user's gesture (a flick, a long press touch, or the like) in addition to the touch interrupt.

The touch screen 312 may include a Liquid Crystal Display (LCD, not shown), transparent glass (not shown) attached onto an upper portion of the LCD with an adhesive member (not shown), and/or a touch panel (not shown) installed below the transparent glass.

The LCD displays an image under the control of the controller 314. A typical LCD includes a liquid crystal display panel which includes a liquid crystal layer and displays an image, and a Back Light Unit (BLU) for providing light to the liquid crystal display panel. The liquid crystal display panel includes the liquid crystal layer and upper and lower glass substrates which are disposed on and under the liquid crystal layer to control an arrangement state of liquid crystal molecules. The lower glass substrate includes Thin Film Transistors (TFTs) and pixel electrodes, and the upper glass substrate includes a common electrode.

The liquid crystal display panel further includes upper and lower polarization plates that are disposed on and under the liquid crystal layer and linearly polarize input light. Polarization directions of the upper and lower polarization plates are orthogonal to each other.

The touch panel generates the touch interrupt or the input interrupt upon touch on the surface of the transparent glass by the user input means such as a finger, a stylus pen, or the like, and outputs the user input information including input coordinates and an input state to the controller 314.

The controller 314 controls the overall operation of the portable terminal. For example, the controller 314 performs related control and processing for voice communication, data communication, video communication, and the like.

The controller 314 further displays an item list in a particular service function selected by the user, senses a user's gesture in a region where each item is marked and an adjacent region thereof in the displayed item list to display menus provided by the service function or activate menu lists, receives an input of a particular list in the activated menu list through a user's gesture, and resets a menu to be displayed by a user's gesture sensed in the adjacent region of the item-marked region.

More specifically, the controller 314 includes a gesture sensing unit 316 for sensing a user's gesture in a region where the item list is displayed and identifying a region where a user gesture signal is input, and a menu setting unit 318 for displaying a plurality of menu lists related to a service function at a side of the item-marked region in the form of a separate window if the user gesture signal sensed by the gesture sensing unit 316 has been sensed in the item-marked region, receiving an input of a particular menu list selected by the user among the displayed menu lists, and resetting the input menu list as a to-be-automatically-displayed menu.

Upon receiving a user's selection of the particular service function, the controller 314 divides a display unit region of the portable terminal into as many regions as the number of items in the particular service function, and displays a corresponding item in each divided region.

The memory 320 stores various information or data selected based on user selection information, and user-stored information.

The memory 320 may also store programs for processing and control operations of the controller 314, and may function to temporarily store input/output data (for example, a phone book, at least one message, a media player, a small notebook computer, and the like).

Figure 5:
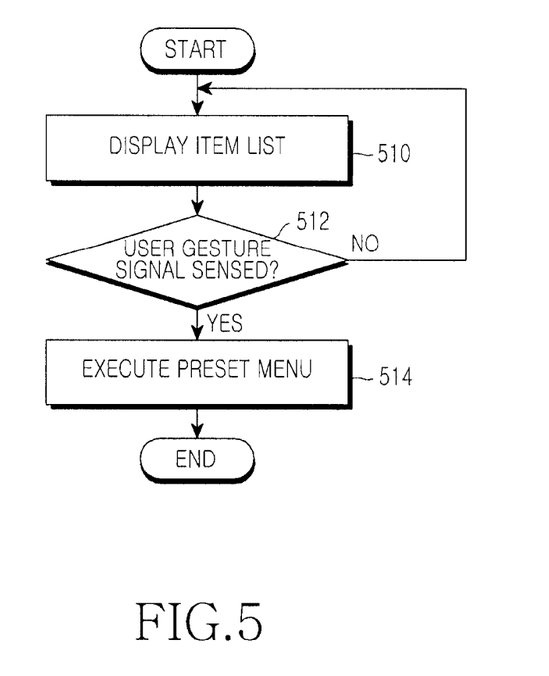
FIG. 5 is a flowchart illustrating a menu executing method in a portable terminal according to the present invention.
Figure 6A:
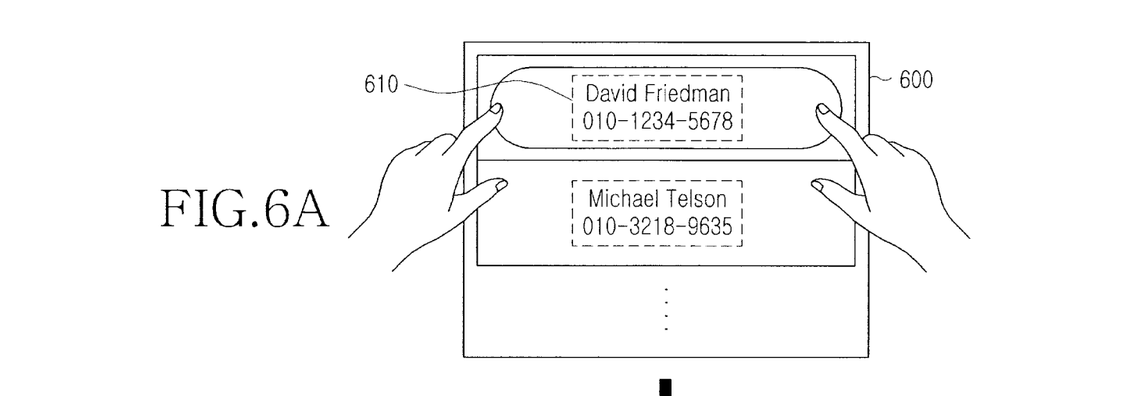
FIGS. 6A through 6C are diagrams illustrating screens to which a menu executing method in a portable terminal according to the present invention is applied.
Figure 6B:
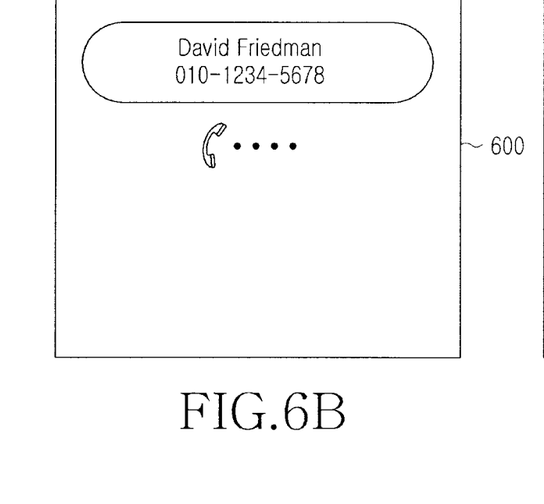
Figure 6C:
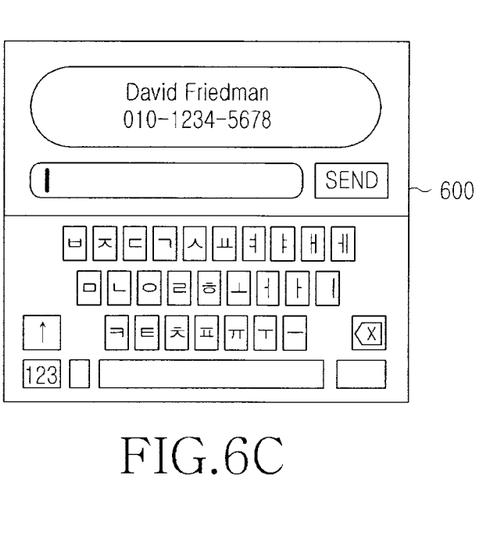

FIG. 5 is a flowchart illustrating a menu executing method in a portable terminal according to the present invention, and FIGS. 6A through 6C are diagrams illustrating screens to which a menu executing method in a portable terminal according to the present invention is applied.

As shown in FIG. 5, to perform a particular service function in a state where at least one item list is displayed, an item is selected from the displayed item list and then a corresponding preset menu is executed by a particular gesture or an application for executing a corresponding menu is provided, without an additional entrance to a menu tree.

With reference to FIGS. 6A through 6C, FIG. 6A illustrates an entry for a partner (i.e., David Friedman with a particular phone number). FIG. 6B illustrates a screen wherein by making a gesture in the area to the right of a partner's phone number item (see FIG. 4A) in a phone book list in FIG. 6A, a call is automatically made. FIG. 6C illustrates a screen wherein by making a gesture in the area to the left (see FIG. 4A) of a partner's phone number item (see FIG. 6A) an application for writing and sending a message to the partner's phone number is provided.

In a preferred embodiment, menu execution and application and communication services may be executed by a multi-gesture using two or more fingers as well as a single gesture using a single finger, and e-mail, real-time chatting, voice communication, and voice message services may be immediately executed or provided by various gestures such as up/down/left/right/diagonal directions and/or moving distance sensing, rotation, and the like.

As is apparent from the foregoing description, a user's gesture is sensed and a menu related to a particular service function is automatically displayed by a single touch without a need for multi-stage screen movement, or the user directly sets a desired menu as a to-be-automatically-displayed menu, thus allowing fast menu execution.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

In addition, the menu execution method in the portable terminal according to the present invention can be embodied as software (that is, a program) or a combination thereof. The program may be stored in a machine-readable volatile or non-volatile recording medium such as a computer, and such a recording medium may include a storage device such as Read Only Memory (ROM), a memory such as a Random Access Memory (RAM), a memory chip, and an integrated circuit, and an optical or magnetic recording medium such as a Compact Disc (CD), a Digital Versatile Disk (DVD), a magnetic disk, a magnetic tape, or the like.

As described above, operations associated with the menu execution method and the menu execution apparatus in the portable terminal according to the present invention can be performed. While the present invention has been shown and described with reference to an exemplary embodiment thereof, it will be understood by those skilled in the art that various changes in form and details may be made therein without departing from the spirit and scope of the invention as defined by the appended claims. Therefore, the scope of the present invention should be defined by the appended claims and equivalents thereof, rather than the disclosed embodiment.

What is claimed is:

1. A task execution method operable in a portable terminal, the task execution method comprising:
    displaying, on a touch screen in response to user input that results in execution of a particular service function, an item list which comprises a plurality of divided regions in each of which a corresponding item of the executed service function is formed;
    recognizing a user gesture at one of a first position and a second position, the second position being different from the first position in a particular divided region of the plurality of divided regions, in which the first position is located in a first sub-region and the second position is located in a second sub-region of the particular divided region and wherein the first and second sub-regions are adjacent to and associated with an item-marked region of the particular divided region; and
    executing a preset executable task corresponding to the position of the recognized user's gesture,
    wherein a first executable task for providing a first service related to the item formed in the particular divided region is preset corresponding to the first position of the divided region and a second executable task for providing a second service related to the item formed in the particular divided region is preset corresponding to the second position of the particular divided region on the touch screen, the second service being different from the first service.

2. The task execution method of claim 1, wherein the item is formed between the first position and the second position.

3. The task execution method of claim 1, wherein if a user gesture with respect to the item is recognized, a menu for executing at least one service, which is related to the item and is different from the first service and the second service, is displayed.

4. The task execution method of claim 3, wherein if a user gesture with respect to the item is recognized, a window for displaying a plurality of menus, which are related to the item and are different from the first service and the second service, is formed.

5. The task execution method of claim 1, wherein the item is displayed in the form of a text or an icon which is selectable by a user input means.

6. The task execution method of claim 1, wherein the user gesture is one pointing action selected from the group consisting of: a long press touch, a tap, and a flick.

7. The task execution method of claim 1, wherein the executable task is user selectable.

8. The task execution method of claim 1, wherein the executable task is one of a plurality of execution commands included in menu lists applicable to the item.

9. The method of claim 1, wherein the first and second sub-regions are each unmarked sub-regions, and the recognized user gesture is a user gesture that excludes any touch input on the item-marked region.

10. The method of claim 1, wherein the first and second executable tasks corresponding to the first and second positions are preset without user controlled set-up thereof.

11. The task execution method of claim 1, wherein the currently executed service function is a phone book function, and each item in the item list is a phone book contact.

12. The task execution method of claim 11, wherein the first service related to the item is a first type of communication service, and the second service related to the item is a second type of communication service.

13. The task execution method of claim 12, wherein the first type of communication service is a messaging service and the second type of communication service is a voice communication service.

14. A task execution apparatus in a portable terminal, the task execution apparatus comprising:
a touch screen; and
a controller for:
displaying, on the touch screen in response to user input that results in execution of a particular service function, an item list which comprises a plurality of divided regions in each of which a corresponding item of the executed service function is formed;
recognizing a user gesture at one of a first position and a second position in a divided region of the plurality of divided regions, the second position being different from the first position in which the first position is located in a first sub-region and the second position is located in a second sub-region of a particular divided region and wherein the first and second sub-regions are adjacent to and associated with an item-marked region of the particular divided region; and
executing an executable task corresponding to the recognized position,
wherein a first executable task for providing a first service related to the item formed in the particular divided region is preset corresponding to the first position of the divided region on the touch screen, and a second executable task for providing a second service related to the item formed in the particular divided region is preset corresponding to the second position of the divided region on the touch screen, the first and second services being different.

15. The task execution apparatus of claim 14, wherein the controller comprises:
a gesture sensing unit for:
sensing the user gesture in the divided region where the item is displayed, and
identifying a region where a user gesture signal is input; and
a menu setting unit for:
displaying a menu for executing at least one service, that is related to the item and is different from the first service and the second service, if the user gesture signal sensed by the gesture sensing unit is a user gesture for the item, and
forming a window for displaying a plurality of menus which are different from the first service and the second service.

16. The task execution apparatus of claim 14, wherein the user gesture represents an action selected from the group consisting of: a long press touch, a tap, and a flick.

17. The task execution apparatus of claim 14, wherein the executable task is one of a plurality of execution commands included in menu lists applicable to the item.

18. A non-transitory computer-readable recording medium having recorded thereon a program, which when loaded into a controller causes the controller to execute the steps of:
displaying, on a touch screen in response to user input that results in execution of a particular service function, an item list which comprises a plurality of divided regions in each of which a corresponding item of the executed service function is formed;
recognizing a user gesture at one of a first position and a second position, the second position being different from the first position in a particular divided region of the plurality of divided regions in which the first position is located in a first sub-region and the second position is located in a second sub-region of the particular divided region and wherein the first and second sub-regions are adjacent to and associated with an item-marked region of the particular divided region; and
executing a preset executable task corresponding to the position of the recognized user's gesture,
wherein a first executable task for providing a first service related to the item formed in the particular divided region is preset corresponding to the first position of the divided region and a second executable task for providing a second service related to the item formed in the particular divided region is preset corresponding to the second position of the particular divided region on the touch screen, the second service being different from the first service.

19. A task execution method operable in a portable terminal, the task execution method comprising:
displaying, on a touch screen in response to user input that results in execution of a particular service function, an item list which comprises a plurality of divided regions in each of which a plurality of divided sub-regions are formed, the sub-regions of each divided region including an item-marked region representing an item of the item list, and plural unmarked regions each adjacent to the item-marked region; and
in response to recognizing a user gesture at one of the unmarked regions of a particular divided region, executing, without further user input, a preset communication function with respect to the item of the particular divided region.

20. The task execution method of claim 19, wherein:
the currently executed service function is a phone book function, and each item in the item list is a phone book contact;
the preset communication function is a function of automatic dialing to a terminal of the phone book contact of the particular divided region; and
further comprising, in response to recognizing a user gesture at a further one of the unmarked regions of the particular divided region, executing another preset type of communication service with respect to the phone book contact of the particular divided region.

21. The task execution method of claim 20, wherein the item-marked region of the particular divided region is located between the one of the unmarked regions and the further one of the unmarked regions.

22. The task execution method of claim 20, further comprising, executing a preset executable task for a third service related to the item when the recognized user gesture is a non-directional gesture, wherein the third service is different from the first and second types of communication.

23. A task execution apparatus in a portable terminal, the task execution apparatus comprising: a touch screen; and
a controller for:
displaying, on a touch screen in response to user input that results in execution of a particular service function, an item list which comprises a plurality of divided regions in each of which a plurality of divided sub-regions are formed, the sub-regions of each divided region including an item-marked region representing an item of the item list, and plural unmarked regions each adjacent to the item-marked region; and
in response to recognizing a user gesture at one of the unmarked regions of a particular divided region, executing, without further user input, a preset communication function with respect to the item of the particular divided region.

24. The task execution apparatus of claim 23, wherein the controller executes a preset executable task corresponding to the recognized user gesture by:
executing a first executable task for providing a first service related to the item when the recognized user gesture is a directional gesture toward a first position in a first one of the unmarked sub-regions; and
executing a second executable task for providing a second service related to the item when the recognized user gesture is a directional gesture toward a second position in a second one of the unmarked sub-regions,
wherein the second service being different from the first service.

25. The task execution apparatus of claim 24, wherein the item-marked region is formed is located between the first position and the second position of the particular divided region.

26. The task execution apparatus of claim 25, wherein the controller executes a preset executable task for a third service related to the item when the recognized user gesture is a non-directional gesture, wherein the third service is different from the first service and the second service.

* * * * *